Aug. 16, 1955  S. H. FILLION  2,715,510
MOUNTS FOR ISOLATING VIBRATION AND ABSORBING SHOCK
Filed Oct. 21, 1953  2 Sheets-Sheet 1
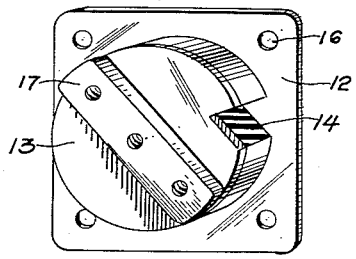
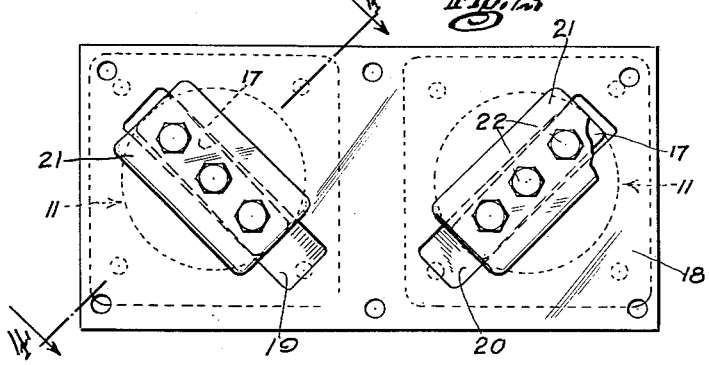
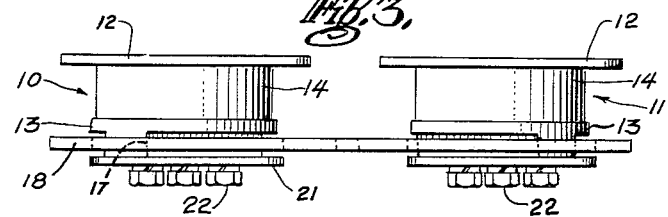
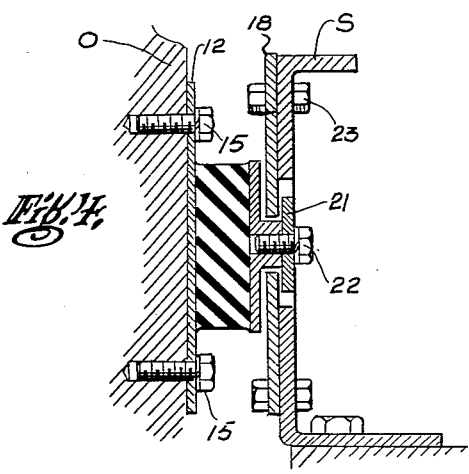
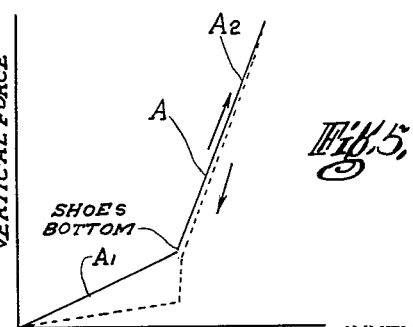
INVENTOR
Stanley H. Fillion
BY
Pennie Edmonds Morton Barrows Taylor
ATTORNEYS Aug. 16, 1955  S. H. FILLION  2,715,510
MOUNTS FOR ISOLATING VIBRATION AND ABSORBING SHOCK
Filed Oct. 21, 1953  2 Sheets-Sheet 2
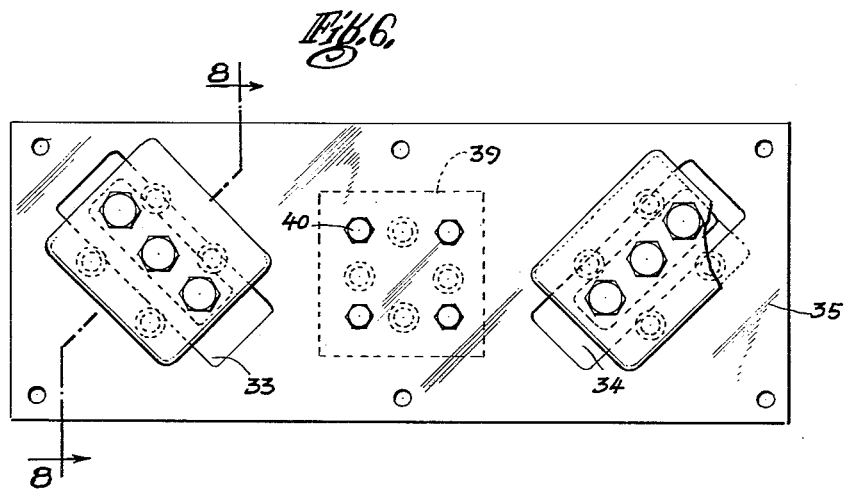
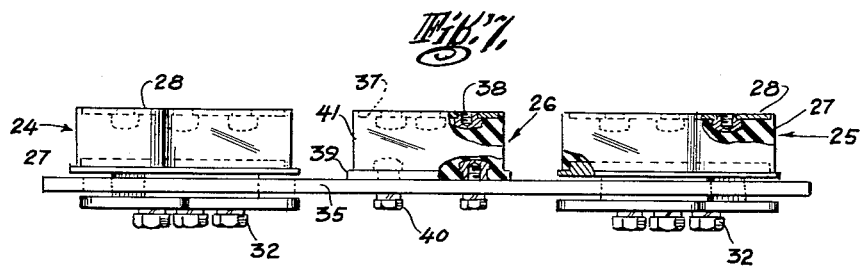
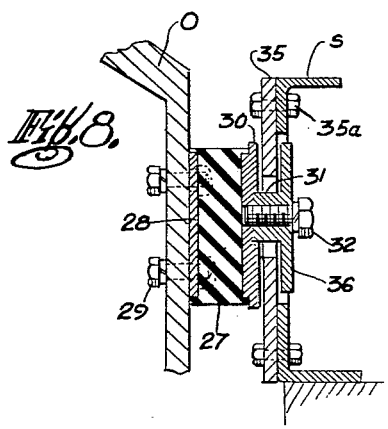
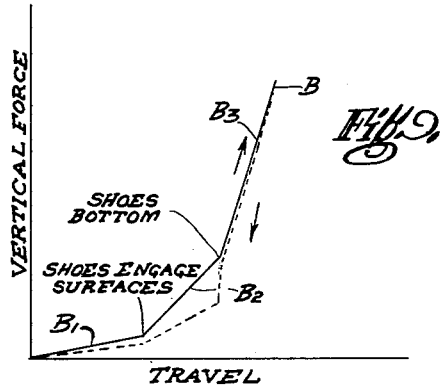
INVENTOR
Stanley H. Fillion
BY
Pennie Edmonds Morton Barrows & Taylor
ATTORNEYS

United States Patent Office 2,715,510
Patented Aug. 16, 1955

2,715,510

MOUNTS FOR ISOLATING VIBRATION AND ABSORBING SHOCK

Stanley H. Fillion, Scarsdale, N. Y., assignor to Waugh Equipment Company, New York, N. Y., a corporation of Maine Application October 21, 1953, Serial No. 387,461

9 Claims. (Cl. 248—358)

This invention relates to mounts to be interposed between an object and a fixed support to carry the weight of the object and to isolate it from vibration and absorb shock. More particularly, the invention is concerned with a novel mount of the type referred to, which is of simple construction, light in weight, and highly effective for its intended purpose.

Mounts for protecting objects against injury by cushioning vibration and absorbing shock, which would otherwise be applied directly to the objects, are in wide use and frequently include rubber shear blocks as the resilient elements. Such rubber shear block comprises a pair of plates, one connected to the object and the other to the support, and a mass of rubber between and bonded to the plates, the weight of the object subjecting the rubber to a shearing stress. While mounts including shear blocks are satisfactory for many purposes, they operate with a linear load-deflection curve and thus, when employed under conditions, in which resonant vibration may be set up, may not afford the desired protection to the object.

The present invention is directed to the provision of a novel mount for cushioning vibration and protecting against shock, which differs from and is superior to prior similar mounts in a number of important respects. Thus, the new mount is provided with means, by which part of the applied force is converted into friction and dissipated as heat, so that its action is non-linear and resonant conditions are minimized. The action of the new mount may be varied within wide limits by changes in the manner of its installation and in its constructional details. It is thus possible, for example, to cause the new mount to provide a relatively soft suspension through a normal range and, at the same time, to provide the stiff action required for protection against shock.

For a better understanding of the invention, reference may be made to the accompanying drawings, in which, Fig. 1 is a view in perspective of a part of the new mount;

Fig. 2 is a view in front elevation of one form of the new mount;

Fig. 3 is a top plan view of the mount shown in Fig. 2;

Fig. 4 is a sectional view of the mount shown in Fig. 2 installed between an object and a support, the section being taken on the line 4—4 of Fig. 2;

Fig. 5 is a graph showing the load-deflection curve of the mount of Fig. 2;

Fig. 6 is a view in front elevation, with parts broken away, of another form of the new mount;

Fig. 7 is a plan view of the mount shown in Fig. 6 with parts broken away;

Fig. 8 is a sectional view showing the mount of Fig. 6 installed between an object and a support, the section being taken on the line 8—8 in Fig. 6; and Fig. 9 is a graph showing the load-deflection curve of the mount of Fig. 6.

The new mount in the form shown in Fig. 2 comprises a pair of rubber shear blocks 10, 11, each of which is made up of a pair of metal plates 12, 13, the two plates being connected by a mass of rubber 14, which is bonded to the opposed inner faces of the plates. The plates 12 of both shear blocks are to be connected to either the object or the support and, for this purpose, each plate is made of greater area than the rubber mass. In the construction shown, the rubber mass 14 and plate 13 are of circular outline, while the plate 12 is square and its sides are of greater length than the diameter of the rubber mass. In the installation shown in Fig. 4, the plates 12 are secured to the object O by screws 15 passed through openings 16 adjacent the corners of the plates.

The plate 13 of each shear block is provided with a shoe 17 extending diametrically from its outer face and entering a slot in a member 18, which has the form of a rectangular plate. The slots 19, 20 for the shoes of the two shear blocks lie at an angle to each other and at an angle to the vertical, and the mount is preferably installed in such manner that the slots converge downwardly and lie at an angle of 45° to the vertical. Each of the slots 19, 20 is substantially longer than the shoe 17 entering the slot and, in the form of the mount shown in Fig. 2, the width of the slots is only slightly greater than the width of the shoes.

Outside the plate 18, each shoe is provided with a head 21, which is illustrated as taking the form of a rectangular plate secured to the outer end of the shoe by a plurality of screws 22. The head 21 is wider than the slots so that the shoe cannot be accidentally removed from its slot. The plate 18 is intended to be secured to either the support or the object and, in the construction shown, is secured to the support S by bolts 23. The support is cut away to receive the heads on the two shoes.

In the mount of Fig. 2, the shoes normally lie slightly turned in their slots, so that their upper outer and inner lower corners engage the upper and lower surfaces, respectively, of the slots. When a force is applied to the object causing it to move down, the plates 12 of the shear blocks move with the object and, at the same time, act through the rubber masses to cause the shoes 17 to move down the surfaces of the slots toward the lower ends thereof. In such movement of the shoes in contact with the surfaces, part of the applied force is converted into frictional heat, which is dissipated. If the force is sufficiently great, the shoes will move down the slots until they engage the lower ends thereof, after which there can be no farther movement of the shoes relative to plate 18 and farther movement of the object results in further distortion of the rubber masses of the shear blocks. If the applied force is in the opposite direction, the action is reversed and the shoes move along the friction surfaces of the slots, until they engage the upper ends of the slots.

It will be apparent that the cushioning action of the mount during the period, when the shoes are free to travel in the slots, is softer than the action during the period after the shoes have bottomed. This is made clear by the load-deflection curve A of Fig. 5. During the initial action represented by the section $A_1$ of the curve, the travel per increment of applied force is relatively large, but, as shown by the section $A_2$ of the curve, the cushioning action is much stiffer and the travel correspondingly reduced per increment of applied force, after the shoes have bottomed.

With the slots in plate 18 lying at 90° to each other and the mount installed, so that the slots lie at 45° to the vertical, the mount acts in the same manner and gives the same cushioning and shock absorbing effects for forces applied vertically or horizontally. If the forces are along lines other than horizontal or vertical, the action of the mount will depend on the angle of application of the force. Thus, if the vibration acts in a direction substantially lengthwise of one slot, and substantially transverse to the other, the shoe in the first slot may generate friction, but the shoe in the second slot will merely engage the slot walls in alternation and generate little or no friction.

In the construction shown in Fig. 2, the shoes 17 are of approximately the same width as the slots, so that only a slight vertical or horizontal movement of either shoe is necessary to cause it to engage a friction surface of the slot and the shoes are in contact with the surfaces under normal loads. In some instances, it may be desirable to defer the development of friction, so that a soft cushioning action is initially provided before the generation of friction starts. A mount constructed to give this and other effects is shown in Figs. 6-8, inclusive.

The mount shown in Fig. 6 comprises three shear blocks 24, 25, 26 lying in a row. Each of the outer blocks 24, 25 includes a rubber mass 27 of rectangular cross-section bonded to a metal plate 28, which may be secured by bolts 29 to the object or the support and is shown as being attached to the object O. Each rubber mass 27 is also bonded to a metal plate 30, to the outer face of which a shoe 31 is attached by bolts 32. The shoes of the shear blocks 24, 25 extend through respective slots 33, 34 in a plate 35, which is of rectangular shape and is adapted to be secured to the support S by bolts 35a. Each shoe is provided at its outer end with a head 36, which overlies the later edges of its slot, and the support is cut away to provide space for the head.

The middle shear block 26 comprises a plate 37, which may be attached by bolts 38 to the object, a plate 39 which may be attached by bolts 40 to the plate 35, and a mass of rubber 41 lying between and bonded to the plates 37, 39.

In the mount shown in Fig. 6, the shoes 31 attached to the plates 30 of the shear blocks 24, 25 are substantially shorter and narrower than their respective slots 33, 34 and the mount is ordinarily installed with the shoes lying midway between the friction surfaces of their slots. As a consequence, the object is initially supported only by the shear block 26 and the mount provides an initial cushioning action, which is relatively soft. When the force applied to the object is sufficient to cause the shoes of shear blocks 24, 25 to engage the friction surfaces, farther movement of the object causes the shoes to slide along the surfaces with the generation of friction. While the shoes are thus free to slide, the shear blocks 24, 25 are taking part in the cushioning action and the travel per increment of applied load is less than in the initial action. Ultimately, when the shoes bottom against the ends of the slots, farther movement of the object under increased load is resisted by all three shear blocks operating in parallel and there is relatively little travel per increment of load.

The curve B in Fig. 9 is a typical load-deflection curve of the mount of Fig. 6. The curve has an initial section $B_1$, in which the travel per increment of force applied is relatively large, so that the cushioning action is soft. This section of the curve represents the action before the shoes have engaged the friction surfaces of the slots. When the shoes are sliding along the surfaces and friction is developed, the cushioning action becomes stiffer, as indicated by section $B_2$ of the curve, and the final section $B_3$ of the curve represents the action when the three shear blocks are operating in parallel.

For most purposes, it is desirable that the slots lie at an angle of 45° to the vertical, since the mount then has an equal capacity with respect to forces applied either vertically or horizontally. In some cases, however, it may be desirable to alter the angle of the slots to meet specific requirements. Also, while the mount is normally installed in such manner that the shoes lie approximately midway between the ends of their slots, so that a snubbing or damping action is obtained upon the application of a force either upward or downward, it may be desirable in some instances to install the mount, so that the shoes bottom in their slots under load and the snubbing will occur only upon an upward movement of the shoes past the neutral position.

The mounts shown include a plurality of shear blocks with shoes providing friction damping or snubbing means, but it is not necessary that the mount include more than one such shear block. However, when two shear blocks with snubbing means are employed and the slots for the shoes lie at right angles to each other and at 45° to the vertical, the movement of the object is in the direction of the applied force and not at an angle thereto.

I claim:

1. A mount for isolating vibration and absorbing shock between an object and a support, which comprises a pair of parallel plates, a mass of rubber bonded to areas on the opposed inner faces of the plates, means for attaching one plate to the object, a shoe mounted on the outer face of the second plate, a member having a slot entered by the shoe, the slot having friction surfaces engageable by the shoe and the shoe having a head overlying the edges of the slot, and means for attaching the member to the support.

2. A mount for isolating vibration and absorbing shock between an object and a support, which comprises a pair of substantially vertical parallel plates, a mass of rubber bonded to areas on the opposed inner faces of the plates, means for attaching one plate to the object, a shoe mounted on the outer face of the second plate, a member having a slot entered by the shoe, the slot having spaced parallel friction surfaces longer than the shoe and lying at an angle to the vertical and the shoe having a head overlying the edges of the slot, and means for securing the member to the support.

3. A mount for isolating vibration and absorbing shock between an object and a support, which comprises a pair of substantially vertical parallel plates, a mass of rubber bonded to areas on the opposed inner faces of the plates, means for attaching one plate to the object, a shoe mounted on the outer face of the second plate, a member having a slot entered by the shoe, the slot having parallel friction surfaces longer than the shoe and spaced a distance substantially greater than the width of the shoe, the friction surfaces lying at an angle to the vertical and the shoe having a head overlying the edges of the slot, and means for securing the member to the support.

4. A mount for isolating vibration and absorbing shock between an object and a support, which comprises a pair of rubber shear blocks, each including a pair of metal plates connected by a mass of rubber bonded to areas on the opposed inner surfaces of the plates, means for attaching one plate of each block to the object with the plates substantially vertical, a shoe attached to the outer face of the other plate of each block, a member having a pair of slots entered by respective shoes, each slot having friction surfaces engageable by its shoe and the shoe having a head overlying the edges of its slot, and means for attaching the member to the support.

5. A mount for isolating vibration and absorbing shock between an object and a support, which comprises a pair of rubber shear blocks, each including a pair of metal plates connected by a mass of rubber bonded to areas on the opposed inner surfaces of the plates, means for attaching one plate of each block to the object with the plates substantially vertical, a shoe attached to the outer face of the other plate of each block, a member having a pair of slots entered by respective shoes and lying at an angle to the vertical and to each other, each slot having friction surfaces engageable by its shoe and the shoe having a head overlying the edges of its slot, and means for attaching the member to the support.

6. A mount for isolating vibration and absorbing shock between an object and a support, which comprises a pair of rubber shear blocks, each including a pair of metal plates connected by a mass of rubber bonded to areas on the opposed inner surfaces of the plates, means for attaching one plate of each block to the object with the plates substantially vertical, a shoe attached to the outer face of the other plate of each block, a member having a pair of downwardly convergent slots entered by respective shoes, each slot having friction surfaces engageable by its shoe and the shoe having a head overlying the edges of its slot, and means for attaching the member to the support.

7. A mount for isolating vibration and absorbing shock between an object and a support, which comprises a pair of rubber shear blocks, each including a pair of metal plates connected by a mass of rubber bonded to areas on the opposed inner surfaces of the plates, means for attaching one plate of each block to the object with the plates substantially vertical, a shoe attached to the outer face of the other plate of each block, a member having a pair of slots inclined to the vertical and entered by respective shoes, each slot having lateral friction surfaces engageable by its shoe and the shoe having a head overlying the edges of its slot, means for securing the member to the support, a third rubber shear block having one plate attached to the member, and means for attaching the other plate of the third shear block to the object.

8. A mount for isolating vibration and absorbing shock between an object and a support, which comprises a pair of rubber shear blocks, each including a pair of metal plates connected by a mass of rubber bonded to areas on the opposed inner surfaces of the plates, means for attaching one plate of each block to the object with the plates substantially vertical, a shoe attached to the outer face of the other plate of each block, a member having a pair of slots lying at an angle to the vertical and to each other and entered by respective shoes, each slot having lateral friction surfaces engageable by its shoe and the shoe having a head overlying the edges of its slot, means for securing the member to the support, a third rubber shear block having one plate attached to the member, and means for attaching the other plate of the third shear block to the object.

9. A mount for isolating vibration and absorbing shock between an object and a support, which comprises a pair of rubber shear blocks, each including a pair of metal plates connected by a mass of rubber bonded to areas on the opposed inner surfaces of the plates, means for attaching one plate of each block to the object with the plates substantially vertical, a shoe attached to the outer face of the other plate of each block, a member having a pair of downwardly convergent slots entered by the respective shoes, each slot having lateral friction surfaces engageable by its shoe and the shoe having a head overlying the edges of its slot, means for securing the member to the support, a third rubber shear block having one plate attached to the member, and means for attaching the other plate of the third shear block to the object.

No references cited.